United States Patent
Murdock

(10) Patent No.: US 10,385,703 B2
(45) Date of Patent: Aug. 20, 2019

(54) FAN BLADES WITH PROTECTIVE SHEATHS AND GALVANIC SHIELDS

(71) Applicant: UNITED TECHNOLOGIES CORPORATION, Farmington, CT (US)

(72) Inventor: James R. Murdock, Tolland, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 717 days.

(21) Appl. No.: 14/770,256

(22) PCT Filed: Dec. 18, 2013

(86) PCT No.: PCT/US2013/076028
§ 371 (c)(1),
(2) Date: Aug. 25, 2015

(87) PCT Pub. No.: WO2014/137448
PCT Pub. Date: Sep. 12, 2014

(65) Prior Publication Data
US 2016/0003062 A1 Jan. 7, 2016

Related U.S. Application Data

(60) Provisional application No. 61/775,255, filed on Mar. 8, 2013.

(51) Int. Cl.
F01D 5/28 (2006.01)
F01D 5/14 (2006.01)
F04D 29/32 (2006.01)

(52) U.S. Cl.
CPC ............ F01D 5/286 (2013.01); F01D 5/147 (2013.01); F04D 29/324 (2013.01);
(Continued)

(58) Field of Classification Search
CPC ........ F01D 5/147; F01D 5/286; F04D 29/324; F05D 2220/10; F05D 2220/36;
(Continued)

(56) References Cited

U.S. PATENT DOCUMENTS 5,902,647 A * 5/1999 Venkataramani ........ B05D 1/32
427/142
5,908,285 A 6/1999 Graff
(Continued)

OTHER PUBLICATIONS

European Search Reprot for Application No. EP 13 87 7374.
International Search Report for related PCT Application No. PCT/US13/76028; report dated Apr. 16, 2014.

*Primary Examiner* — Mark A Laurenzi
*Assistant Examiner* — Paul W Thiede
(74) *Attorney, Agent, or Firm* — Cantor Colburn LLP

(57) ABSTRACT

Light weight fan blades for turbofan jet engines are disclosed. The fan blades may be fabricated from an aluminum alloy. To enhance the hardness of the leading edge of the fan blade, a titanium sheath may be attached to the leading edges of the fan blades. To prevent galvanic coupling between the titanium and the aluminum, a polymeric liner may be disposed between the protective titanium sheath and the aluminum fan blade. The liner may be fabricated from a polymer material, such as a polyimide or another high performance polymer.

15 Claims, 3 Drawing Sheets

(52) U.S. Cl.
CPC ...... *F05D 2220/10* (2013.01); *F05D 2220/36* (2013.01); *F05D 2230/23* (2013.01); *F05D 2230/60* (2013.01); *F05D 2240/303* (2013.01); *F05D 2240/304* (2013.01); *F05D 2300/133* (2013.01); *F05D 2300/173* (2013.01); *F05D 2300/174* (2013.01); *F05D 2300/43* (2013.01); *F05D 2300/601* (2013.01); *F05D 2300/6012* (2013.01); *Y02T 50/672* (2013.01); *Y02T 50/673* (2013.01)

(58) Field of Classification Search
CPC ............. F05D 2230/23; F05D 2230/60; F05D 2240/303; F05D 2240/304; F05D 2300/133; F05D 2300/173; F05D 2300/174; F05D 2300/43; F05D 2300/601; F05D 2300/6012; Y02T 50/672; Y02T 50/673; B05D 1/32
USPC ...... 416/220, 224, 229 A; 415/220; 427/142
See application file for complete search history.

(56) References Cited

U.S. PATENT DOCUMENTS

| | | |
|---|---|---|
| 6,132,857 A | 10/2000 | Champenois et al. |
| 2003/0071019 A1* | 4/2003 | Cline et al. ............... C23F 1/00 216/109 |
| 2008/0075601 A1 | 3/2008 | Giusti et al. |
| 2009/0074586 A1 | 3/2009 | Le et al. |
| 2011/0194941 A1 | 8/2011 | Parkin et al. |
| 2011/0211967 A1 | 9/2011 | Deal et al. |
| 2011/0229334 A1 | 9/2011 | Alexander |
| 2012/0003100 A1 | 1/2012 | James et al. |
| 2012/0163982 A1* | 6/2012 | Rice ....................... F01D 5/147 416/229 A |
| 2012/0301292 A1 | 11/2012 | Deal et al. |

* cited by examiner

FAN BLADES WITH PROTECTIVE SHEATHS AND GALVANIC SHIELDS

CROSS-REFERENCE TO RELATED APPLICATION

This patent application is a US National Stage under 35 U.S.C. § 371, claiming priority to International Application No. PCT/US13/76028 filed on Dec. 18, 2013, which claims priority under 35 U.S.C. § 119(e) to U.S. Patent Application Ser. No. 61/775,255 filed on Mar. 8, 2013.

TECHNICAL FIELD

This disclosure relates to fan blades for gas turbine engines that utilize protective sheaths to reduce damage from impact of objects striking the fan blades, such as birds.

BACKGROUND

Fan blades for jet engines are typically designed to meet regulations relating to the impact of foreign objects against the fan blades while in operation. For example, regulations require a commercial airline jet engine to be capable of ingesting a medium-sized bird while allowing for continued operation or safe and orderly shutdown of that engine. Further, regulations also require that fan blades must resist cracking from nicks and dents caused by small debris such as sand and rain.

The design requirements may be especially challenging for hybrid fan blades constructed of fiber composite materials that may be less ductile than fan blades formed of metallic alloys. In some cases, composite blade portions may include a nickel sheath for better resistance to erosion. However, nickel is relatively brittle and does not absorb enough energy in the event of a foreign object impact.

While titanium blades are relatively strong and lightweight, fiber composite blades offer sufficient strength and a significant weight savings over titanium. However, fiber composite fan blades are not suitable for smaller engines and the cost of fiber composite materials greatly exceeds that of titanium, which is also costly. Further, both titanium and fiber composite raw materials are also expensive to process. The fan blades often require expensive specialized equipment to process the material into an aerodynamic shape that maintains strength while keeping weight to a minimum. Composite fan blades must have a greater thickness than metal blades to meet the bird strike regulations due to their relatively low strain tolerance. However, increasing the blade thickness reduces fan efficiency and offsets a significant portion of weight savings gained from using composite materials.

Because of the cost of fiber composites and titanium and the lack of ductility of fiber composites, alternative materials are being sought. Such materials include aluminum alloys and aluminum-lithium alloys. Aluminum-lithium alloys, often include copper and zirconium, are significantly less dense than aluminum because lithium has the lowest density of all the metals. Alloying aluminum with lithium provides an alloy that is lighter, stiffer and stronger than an aluminum alloy. For example, every 1% by weight of lithium added to aluminum reduces the density of the resulting alloy by 3% and increases the stiffness by 5%. Aluminum alloys are still excellent materials for fan blades due because they are relatively lightweight and inexpensive.

Despite the advantages of Al—Li and Al alloys, damage to the leading edge of an Al—Li or an Al fan blade may occur in the event of a bird strike or engagement by smaller objects such as sand and debris. Damage to the leading edge of any fan blade may be averted with the use of a protective sheath on the leading edge of the fan blade. The sheaths are typically secured to the leading edge with an adhesive, such as an epoxy. However, the use of a titanium sheath on an aluminum alloy fan blade creates a galvanic couple between the aluminum and the titanium. The galvanic couple accelerates corrosion of the aluminum. The accelerated corrosion is particularly problematic at the highly stressed area of the fan blade near the root of the fan blade along the leading edge. This area of the leading edge near the root may also be subject to handling damage which can expose bare aluminum.

Thus, improved fan blades are needed with improved protective sheets for leading edges than are currently available.

SUMMARY

In one aspect, a fan blade for a jet engine is disclosed. The disclosed fan blade may include a root connected to a blade portion, or an airfoil. The blade portion may include a leading edge and a trailing edge. At least a portion of the leading edge may be covered by a liner. Further, at least a portion of the liner may be covered by a titanium sheath.

In another aspect, a method for increasing the strength of a leading edge of a blade portion of a fan blade for a jet engine is disclosed. The method may include forming a fan blade including a root connected to a blade portion. The blade portion may include a leading edge and a trailing edge. The method may further include attaching a liner to at least part of the leading edge and covering the liner and at least part of the leading edge with a protective sheath.

In another aspect, a fan blade for a jet engine is disclosed that may include a root connected to a blade portion. The blade portion may include a leading edge and a trailing edge. The root and the blade portion may be fabricated from an alloy that includes aluminum. At least a portion of the leading edge and at least a portion of the root may be covered by a polymeric liner. Further, at least a portion of the liner may be covered by a titanium sheath.

In any one or more of the embodiments described above, the blade portion may be fabricated from an aluminum-lithium alloy.

In any one or more of the embodiments described above, the blade portion may be fabricated from an aluminum alloy.

In any one or more of the embodiments described above, the sheath may be fabricated from a titanium alloy.

In any one or more of the embodiments described above, the liner may be polymeric.

In any one or more of the embodiments described above, the liner may include a polyimide fabric.

In any one or more of the embodiments described above, the liner may include an acrylonitrile butadiene styrene (ABS) fabric.

In any one or more of the embodiments described above, the liner may be a woven polymeric fabric.

In any one or more of the embodiments described above, the blade may include a tip disposed opposite the blade from the root and disposed between the leading and trailing edges. The liner may extend from the root to the tip.

In any one or more of the embodiments described above, the liner covers at least part of the root.

In any one or more of the embodiments described above, the liner covers at least part of the root and extends from the root to the tip.

In any one or more of the embodiments described above, the blade may include a tip disposed opposite the blade from the root and between the leading and trailing edges. The sheath may extend from the root to the tip.

In any one or more of the embodiments described above, the liner may be attached to the leading edge of the blade portion with an adhesive, such as an epoxy.

DESCRIPTION

Figure 1:
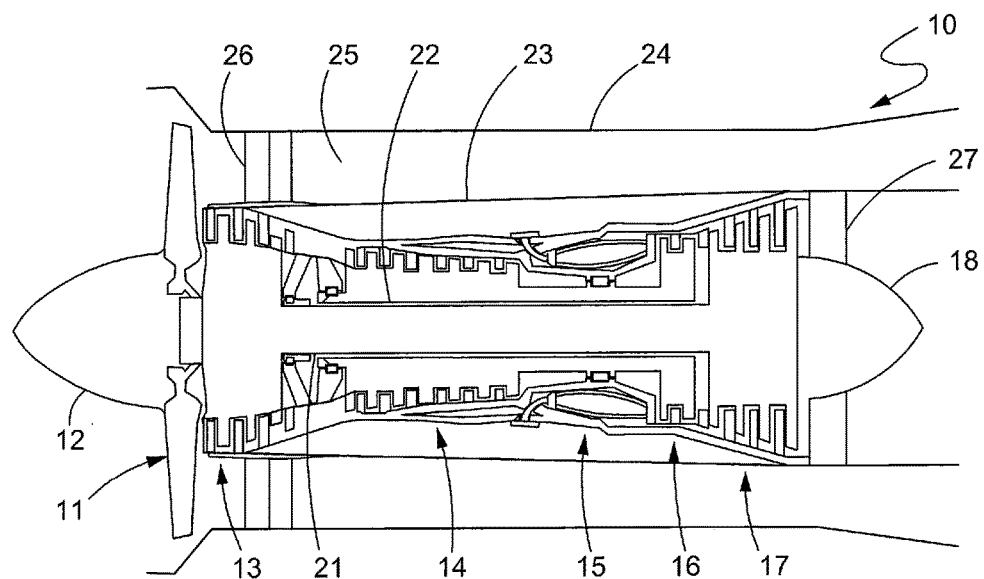
FIG. 1 is a sectional view of a turbofan gas turbine engine.

FIG. 1 is a sectional view of a disclosed gas turbine engine 10. The gas turbine engine 10 may include a fan assembly 11 that is disclosed in greater detail in connection with FIGS. 2-3. The fan blade assembly is mounted immediately aft of a nose cone 12 and fore of a low pressure compressor (LPC) 13. A gearbox (not shown) may be disposed between the LPC 13 and the fan assembly 11. The LPC 13 may be disposed between the fan blade assembly 11 and a high pressure compressor (HPC) 14. The LPC 13 and HPC 14 are disposed fore of a combustor 15 which may be disposed between the HPC 14 and a high pressure turbine (HPT) 16. The HPT 16 is typically disposed between the combustor 15 and a low pressure turbine (LPT) 17. The LPT 17 may be disposed immediately fore of a nozzle 18. The LPC 13 may be coupled to the LPT 17 via a shaft 21 which may extend through an annular shaft 22 that may couple the HPC 14 to the HPT 16. An engine case 23 may be disposed within an outer nacelle 24. An annular bypass flow path may be created by the engine case 23 and the nacelle 24 that permits bypass airflow or airflow that does not pass through the engine case 23 but, instead, flows from the fan assembly 11, past the fan exit guide vanes 26 and through the bypass flow path 25. One or more frame structures 27 may be used to support the nozzle 18.

Figure 2:
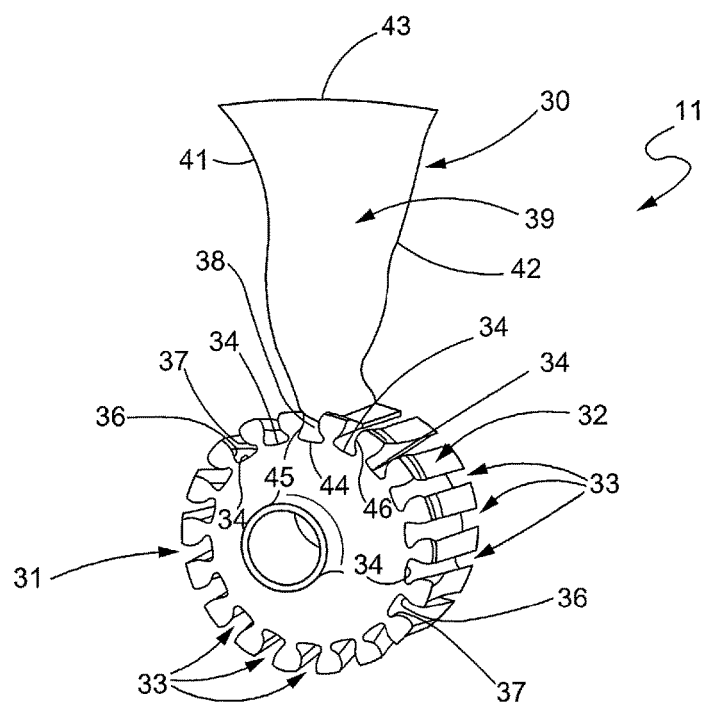
FIG. 2 is a perspective view of a single fan blade coupled to a hub.

Turning to FIG. 2, the fan blade assembly 11 may include a plurality of fan blades 30 mounted to a disc shaped hub 31. More specifically, the disc shaped hub 31 includes an outer periphery 32 through which a plurality of dovetail shaped slots 33 extend. The dovetail shaped slots 33 include inner surfaces 34. The inner surfaces 34 are each disposed between inwardly slanted walls 36, 37 that extend inwardly towards each other as they extend radially outwardly from their respective inner surfaces 34. As also shown in FIG. 2, the dovetail shaped slots 33 may each accommodate a dovetail shaped root 38 of a fan blade 30. The dovetail shaped root 38 may be connected to a blade 39 that includes a leading edge 41 and a trailing edge 42. The leading and trailing edges 41, 42 are disposed on either side of the blade tip 43. The dovetail shaped root 38 may include an attachment portion 40 that includes an inner face 44 that may be disposed between and connected to inwardly slanted pressure faces 45, 46. The pressure faces 45, 46 may each engage the inwardly slanted walls 36, 37 respectively of their respective dovetail shaped slots 33. The root 38 also includes a root transition portion 47 disposed between the root attachment portion 40 and the blade portion 39.

Figure 3:
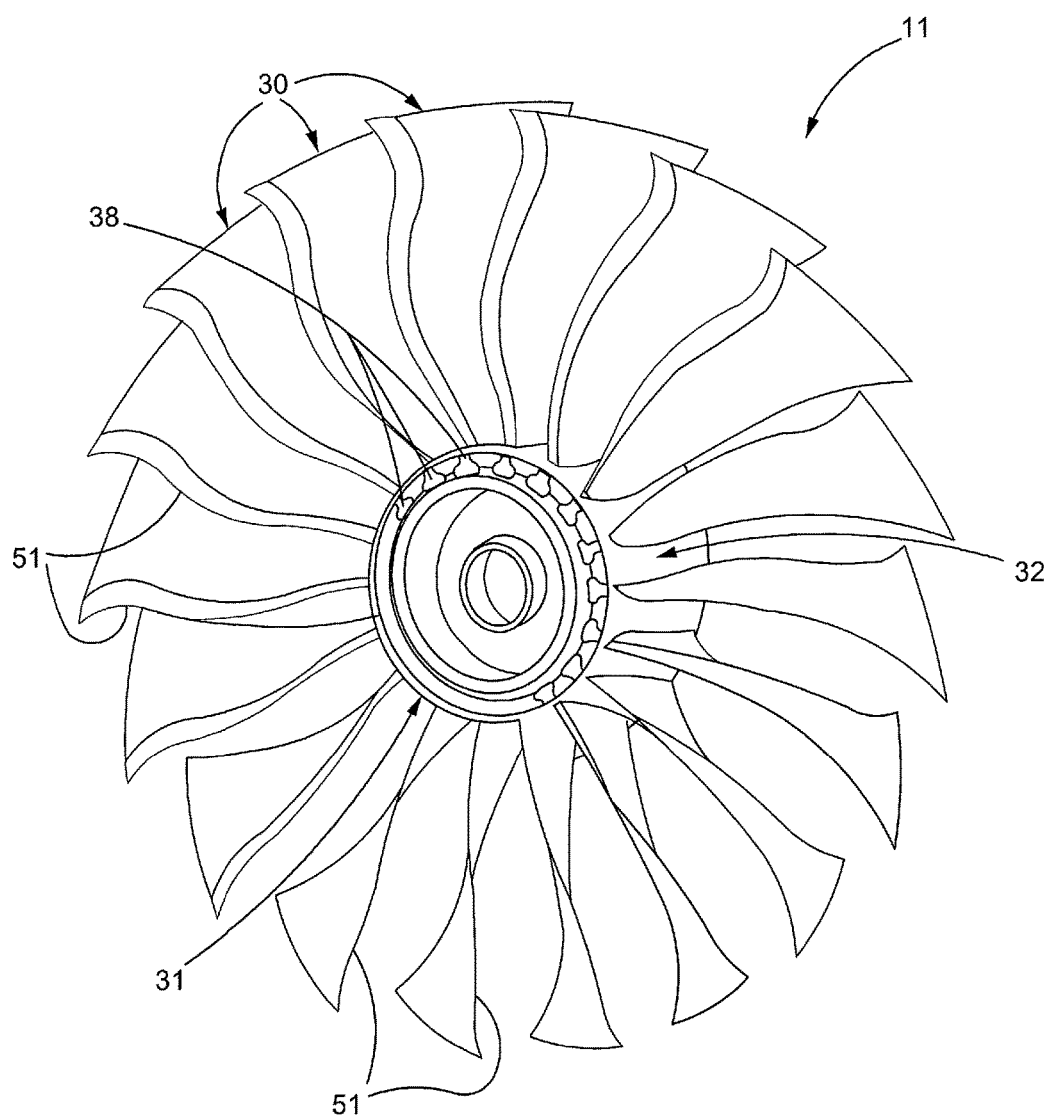
FIG. 3 is a perspective view of a fan assembly that includes a hub coupled to 18 fan blades.
Figure 4:
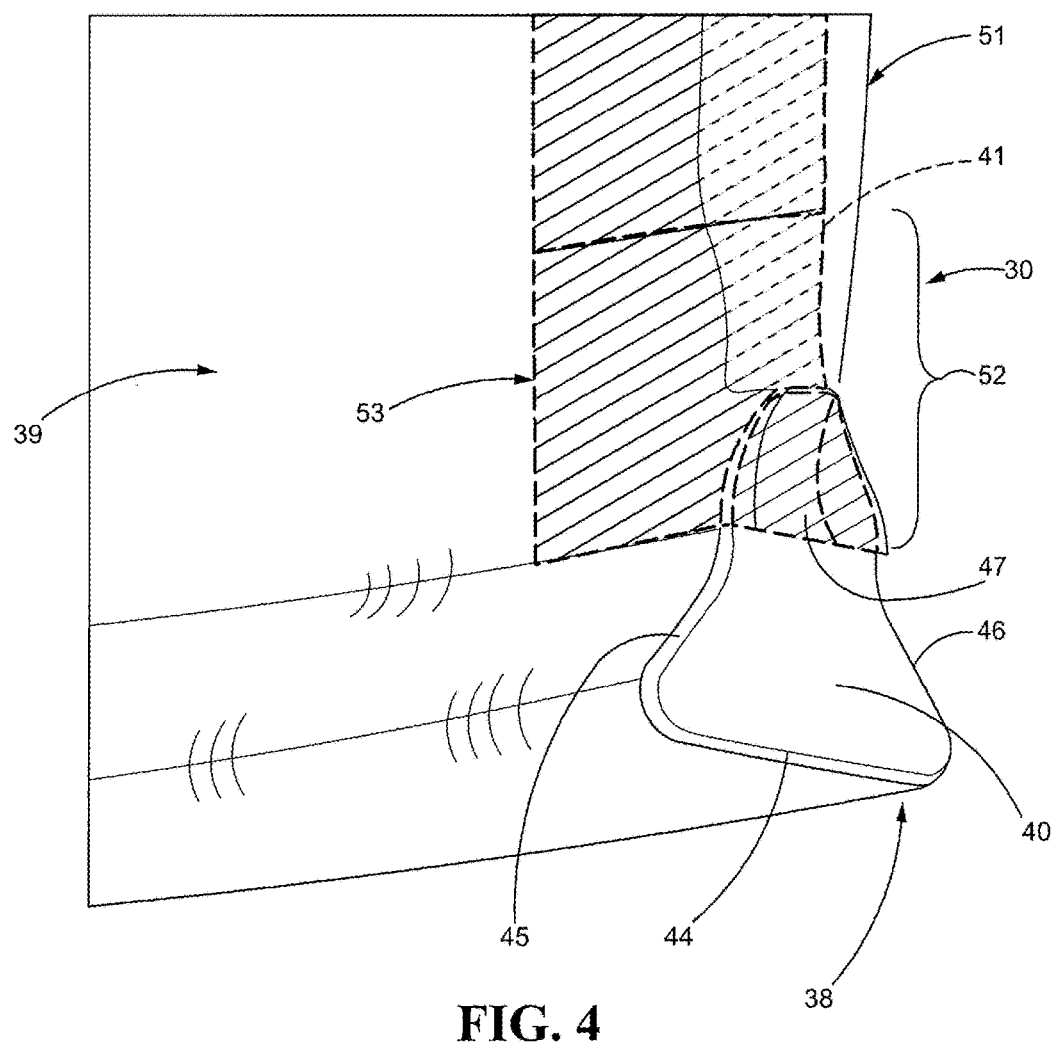
FIG. 4 is a partial perspective view of a leading edge and root of the fan blade that is at least partially covered by a liner which, in turn, is at least partially covered by a protective sheath.

Turning to FIG. 3, the hub 31 is shown with each slot 33 (FIG. 2) accommodating a root 38 of one of the fan blades 30. The fan blade assembly 11 shown in FIG. 3 includes fan blades 30 with leading edges (not shown) that are covered by protective sheaths 51. The sheaths 51 may be fabricated from a material that is harder than the material used to fabricate the fan blades 30. For example, to save weight and cost, fan blades may be fabricated from aluminum, an aluminum alloy or an aluminum-lithium alloy. To achieve the necessary hardness at the leading edges 41 (see FIG. 2), protective sheaths 51 are employed. In one example, the protective sheaths 51 may be fabricated from titanium, which is harder than aluminum or aluminum-lithium alloys. However, when titanium engages aluminum, a galvanic couple exists between the titanium and aluminum. This galvanic couple can accelerate corrosion of the aluminum. This problem is of a particular concern near the highly stressed area at the intersection of the root 38 and the leading edge 41 of the fan blade 30 as shown in FIG. 4. This area, shown at 52 in FIG. 4 is also subject to handling damage, which can expose bare aluminum or aluminum alloy.

To solve the issue of the galvanic coupling between the titanium and aluminum, a rugged fabric liner 53 may be disposed between the blade portion 39 and the titanium protective sheath 51. The liner 53 may also cover an upper portion of the root 38 as shown in FIG. 4. In one embodiment, the liner 53 is a fabric, such as a woven or non-woven fabric. Because of the extreme conditions experienced by the fan blade assembly 11 of a gas turbine engine, the liner 53 may be a high performance polymer fabric, such as a polyimide. Other high performance polymer materials are available, as will be apparent to those skilled in the art.

As one example, the liner may be fabricated from an acrylonitrile butadiene styrene (ABS) fabric. ABS fabrics are heat resistant, provide lubricity and creep resistance therefore making is suitable for the hostile and extreme environmental conditions to which a fan blade assembly 11 is exposed to. One suitable family of fabrics may be fabricated from one of the VESPEL® polymers, available from DuPont.

INDUSTRIAL APPLICABILITY

An aluminum fan blade 30 may be utilized in a jet engine 10 to save weight in comparison to prior art titanium fan blades. An aluminum-lithium alloy fan blade may also be utilized. To provide the necessary hardness at the leading edge 41 of the fan blades 30, a titanium sheath 51 may be employed. To avoid galvanic coupling between the aluminum and titanium, a fabric liner 53 may be disposed between the aluminum alloy fan blade 30, or more specifically, the leading edge 41 of the blade portion 39 and the titanium sheath 51. The fabric material may be polymeric, such as a high performance ABS. Other high performance polymers will be apparent to those skilled in the art. Further, other protective sheaths 51 may be fabricated with materials other than titanium, as will be apparent to those skilled in the art. In any event, when galvanic coupling between the alloy used to fabricate the fan blade 30 and the material used to fabricate the protective sheath 51 is likely to occur, a fabric liner 53 may be disposed between the protective sheath 51 and the leading edge 41 of the blade portion 39 of the fan blade 30. Thus, weight savings may be obtained by using a material lighter than titanium for fabricating the fan blades 30, while titanium used a protective sheath 51 for the leading edge 41 of the fan blade 30 and the problem with galvanic coupling may be avoided by using a liner 53 between the protective sheath 51 and the fan blade 30. Both the liner 53 and protective sheath 51 may be attached to the fan blade 30 using an adhesive material, such as an epoxy. Other adhesive materials and other means for attaching the fabric liner 53 and the protective sheath 51 to the fan blade 30 will be apparent to those skilled in the art.

The invention claimed is:

1. A fan blade for a jet engine, the fan blade comprising:
a root connected to a blade portion, the blade portion including a leading edge and a trailing edge, wherein the leading edge and the trailing edge are disposed on either side of a tip of the blade, the tip being opposite of the root and the root has an attachment portion and a root transition portion between the attachment portion and the leading edge of the blade portion, wherein a leading edge of the root transition portion is aligned with a leading edge of the attachment portion;
at least a portion of the leading edge of the blade portion and at least part of the leading edge of the root transition portion being covered by a fabric liner; and
wherein the fabric liner extends along the leading edge of the blade portion from the root to the tip and the fabric liner is covered by a titanium sheath such that the titanium sheath is galvanically isolated from the blade portion and wherein the titanium sheath is disposed over the leading edge of the blade portion.

2. The fan blade of claim 1 wherein at least the blade portion is fabricated from an aluminum-lithium alloy.

3. The fan blade of claim 1 wherein at least the blade portion is fabricated from an aluminum alloy.

4. The fan blade of claim 1 wherein the sheath is fabricated from a titanium alloy.

5. The fan blade of claim 1 wherein the fabric liner is polymeric.

6. The fan blade of claim 5 wherein the fabric liner is an acrylonitrile butadiene styrene (ABS) fabric.

7. The fan blade of claim 1 wherein the fabric liner is a woven polymeric fabric.

8. A method for increasing strength of a leading edge of a blade portion of a fan blade for a jet engine, the method comprising:
forming a fan blade including a root connected to a blade portion, the blade portion including a leading edge and a trailing edge, wherein the leading edge and the trailing edge are disposed on either side of a tip of the blade, the tip being opposite of the root and the root has an attachment portion and a root transition portion between the attachment portion and the leading edge of the blade portion, wherein a leading edge of the root transition portion is aligned with a leading edge of the attachment portion;
attaching a fabric liner to the leading edge of the blade portion and at least part of the leading edge of the root transition portion, wherein fabric liner extends along the leading edge of the blade portion from the root to the tip; and
covering the fabric liner and at least part of the leading edge with a titanium sheath such that the titanium sheath is galvanically isolated from the blade portion.

9. The method of claim 8 further including:
adhering the sheath to at least part of the fabric liner with an adhesive.

10. The method of claim 8 further including:
adhering the sheath to the leading edge with an adhesive.

11. The method of claim 8 wherein at least the blade portion is fabricated from an aluminum-lithium alloy.

12. The method of claim 8 wherein the sheath is fabricated from a titanium alloy.

13. A fan blade for a jet engine, the fan blade comprising:
a root connected to a blade portion, the blade portion including a leading edge and a trailing edge, the root and blade portion being fabricated from an alloy that includes aluminum and wherein the leading edge and the trailing edge are disposed on either side of a tip of the blade, the tip being opposite of the root and the root has an attachment portion and a root transition portion between the attachment portion and the leading edge of the blade portion, wherein a leading edge of the root transition portion is aligned with a leading edge of the attachment portion;
at least a portion of the leading edge of the blade portion and at least a portion of the leading edge of the root and at least part of the leading edge of the root transition portion being covered by a polymeric liner; and
wherein the polymeric liner extends along the leading edge of the blade portion from the root to the tip and the polymeric liner is covered by a titanium sheath such that the titanium sheath is galvanically isolated from the blade portion and wherein the titanium sheath is disposed over the leading edge of the blade portion.

14. The fan blade of claim 13 wherein the polymeric liner is an acrylonitrile butadiene styrene (ABS).

15. The fan blade of claim 13 wherein the alloy is an aluminum-lithium alloy.

* * * * *